United States Patent [19]

Yoshioka

[11] Patent Number: 4,984,887
[45] Date of Patent: Jan. 15, 1991

[54] DRIVING METHOD FOR A FLAT PANEL DISPLAY APPARATUS AND THE FLAT PANEL DISPLAY APPARATUS

[75] Inventor: Kazuo Yoshioka, Nagasaki, Japan
[73] Assignee: Mitsubishi Denki Kabushiki Kaisha, Tokyo, Japan
[21] Appl. No.: 301,023
[22] Filed: Jan. 24, 1989
[30] Foreign Application Priority Data
Mar. 23, 1988 [JP] Japan .................. 63-71453
[51] Int. Cl.$^5$ .............................................. G02F 1/13
[52] U.S. Cl. ................................... 350/332; 350/334; 350/336; 340/719
[58] Field of Search ...................... 350/336, 332, 334; 340/719, 784

[56] References Cited

U.S. PATENT DOCUMENTS

| | | |
|---|---|---|
| 3,928,658 | 12/1975 | Van Boxtel et al. ............... 340/719 |
| 4,042,861 | 8/1977 | Yasuda et al. ................... 350/336 X |
| 4,270,846 | 6/1981 | Miyamoto ............................ 350/336 |
| 4,426,775 | 1/1984 | Faust et al. ............................ 29/846 |
| 4,468,659 | 8/1984 | Ohba et al. ............................ 340/719 |
| 4,506,261 | 3/1985 | Lawter ............................ 340/719 X |
| 4,655,551 | 4/1987 | Washizuka et al. ................. 350/334 |
| 4,836,651 | 6/1989 | Anderson ............................. 350/334 |

FOREIGN PATENT DOCUMENTS 0042920 1/1982 European Pat. Off. .
62-44787 2/1987 Japan .
2122013 1/1984 United Kingdom ................ 340/719

OTHER PUBLICATIONS

*National Technical Report*, vol. 33, No. 1, Feb. 1987 pp. 69–72.
E. Weise et al., "Elektrische una mechanische Bergindung von Flüssigkristall-Anzeigen (LCD) und Treiberbausteinen", 449 Feinwerktechnik & Messtechnik, 94 (1986) May, No. 4.

*Primary Examiner*—Stanley D. Miller
*Assistant Examiner*—Huy K. Mai
*Attorney, Agent, or Firm*—Burns, Doane, Swecker & Mathis

[57] ABSTRACT

A driving method for a flat panel display apparatus and a flat panel display apparatus for executing the driving method therefor, in which the order of display data allotted to one driving integrated circuit is changed at every half the number so as to supply the display data to the driving integrated circuit, whereby output terminals of each film carrier are arranged approximately perpendicular to the side on which input terminals of the driving integrated circuit are arranged. Accordingly, the film carrier is reducible in width in comparison with the conventional one, thereby enabling the entire apparatus to be small-sized, resulting in that a display panel of smaller pitch between the picture elements can be driven by the apparatus of the invention.

7 Claims, 6 Drawing Sheets $W_R \geq W$
$(p \times m \geq a+b+c)$

DRIVING METHOD FOR A FLAT PANEL DISPLAY APPARATUS AND THE FLAT PANEL DISPLAY APPARATUS

BACKGROUND OF THE INVENTION

1. Field of the Invention

The present invention relates to a driving method for a flat panel display apparatus and the flat panel display apparatus for executing the driving method.

2. Description of the Prior Art

It is desired for mounting technique in the flat panel display apparatus to realize the high density mounting in order to expect simplification of the entire apparatus. Especially, high densification is required for mounting a driving IC (integrated circuit) for driving the display panel. FIG. 1 is a typical view of mounting method of a driving IC disclosed in, for example, Page 70 of "National Technical Report" (Feb. 1987), for satisfying the above requirement. This example forms an electrode pattern on a base film of polyimide resin and thermocompression-bonds a driving IC chip on the base film, thereby expecting an improvement in mounting density.

Referring to FIG. 1, reference numeral 1 designates a film carrier on which an electrode pattern is formed by plating Au on the surface layer of Ni. FIG. 2 is an enlarged view of the film carrier 1, at the center of which a driving IC chip 2 comprising a shift register and a level shifter is mounted, the driving IC chip 2 being rectangular when viewed in plane. FIG. 3 is typical view showing an arrangement of input and output terminals at the driving IC chip 2. Input signal terminals are arranged on one side of the rectangular chip 2, output signal terminals being arranged on other three sides counterclockwise (or clockwise) in regular order. The output signal lines from the output signal terminals at two parallel sides of the chip 2 show on the film carrier 1 a traveling pattern such that the output signal lines at first travel outwardly from the driving IC chip 2 and then perpendicularly bend and travel toward an electrode of a liquid crystal display panel 3.

The above-mentioned example using the film carrier 1 in order to mount the driving IC chip 2 improves the mounting density more than the IC packaged in the conventional way.

Next, explanation will be given on operation of the aforesaid conventional example.

The driving IC chip 2 is given display data sequentially through the input signal lines and outputs driving signals to the liquid crystal display panel 3 through the output signal lines. Concretely, the number of data, that is, the number of outputs, allotted to one driving IC chip 2 is represented by 2N, and the driving signals to be supplied to electrodes L (1), L(2) ... L(2N) on the liquid crystal display panel 3 connected with the output signal lines of driving IC chip 2 are represented by S(1), S(2) ... S(2N), S(1) being outputted from an output terminal OUT(1), S(2) from that OUT(2), and S(2N) from that OUT(2N), the display data corresponding to each driving signal are represented by D(1), D(2) ... D(2N) and supplied in the order of D(1), D(2) ... D(2N) to the driving IC chip 2".

Pitch between the picture elements on the liquid crystal display panel 3 becomes narrow following an improvement in resolution of the flat panel display apparatus, then the relation between a width w of the film carrier 1 and a product $p \times m$ of the pitch p between the picture elements multiplied by the number m of data allotted to one driving IC chip 2 becomes problematically. In case of the aforesaid conventional flat panel display apparatus width w of the film carrier 1 is limited by the sum of a width a of the driving IC chip 2 and pattern printing widths b and c. On the other hand, a width $w_R$ of film carrier 1 permitted for practical use depends on the product $p \times m$.

As shown in FIG. 4, there is no problem when a relation of $w_R \geq w$ ($p \times m \geq a+b+c$) is maintained, but when the pitch p between the picture elements decreases following the improvement in resolution of the liquid crystal display panel 3 to cause a relation of $w_R < w$ ($p \times m < a+b+c$) as shown in FIG. 5, geometrical inconvenience, that is, the trouble-some problem about mounting between the adjacent film carriers 1 is caused.

SUMMARY OF THE INVENTION

The present invention has been designed to solve the above problem. The driving method for the flat panel display apparatus of the invention supplies the display data to a driving IC in the order which is established by dividing the display data allotted to one driving IC into halves and exchanging the former half and the latter half. The flat panel display apparatus of the invention arranges the output terminals of a film carrier on the sides perpendicular to the side on which input terminals of the driving IC are arranged.

A first object of the invention is to provide a driving method for the flat panel display apparatus and the flat panel display apparatus, which can reduce a width of the film carrier without being limited by pattern printing width as the conventional.

A second object of the invention is to provide a driving method for a flat panel display apparatus and the flat panel display apparatus, which can reduce a width of the film carrier in comparison with the conventional one, thereby expecting simplification of the entire apparatus.

A third object of the invention is to provide a driving method for a flat panel display apparatus and the flat panel display apparatus, which can reduce a width of a film carrier in comparison with the conventional one so that a display panel, even when smaller in pitch between the picture elements, can be driven.

The above and further objects and features of the invention will more fully be apparent from the following detailed description with accompanying drawings.

DESCRIPTION OF THE PREFERRED EMBODIMENTS

Next, concrete explanation willl be given on an embodiment of a flat panel display apparatus of the invention.

Figure 6:
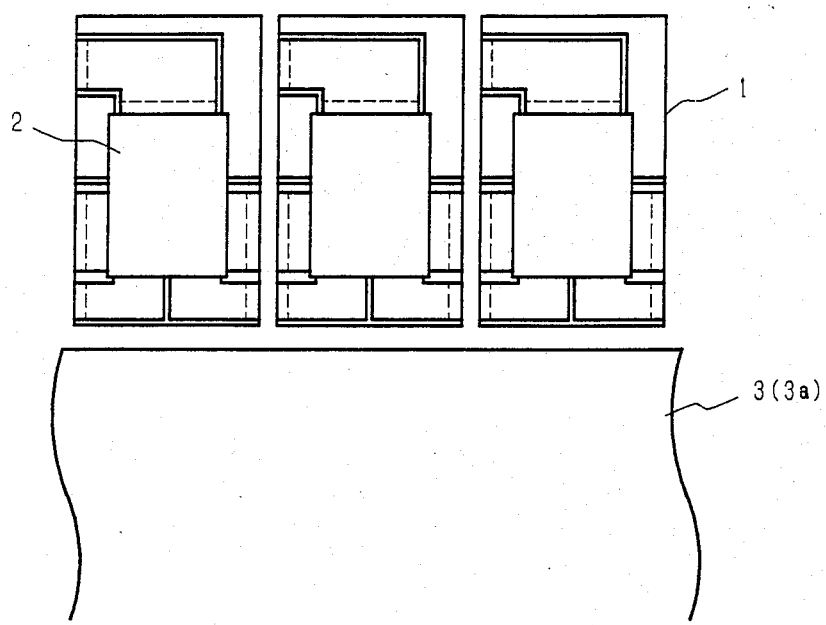
FIG. 6 is a typical view showing the mounting method of a driving IC for executing the driving method of the invention.
Figure 7:
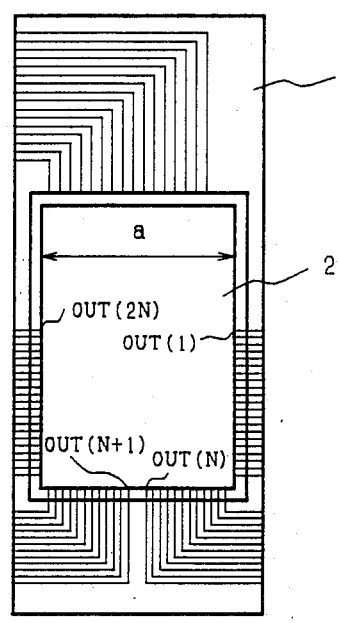
FIG. 7 is an enlarged view of a film carrier for executing the driving method of the invention.
Figure 8:
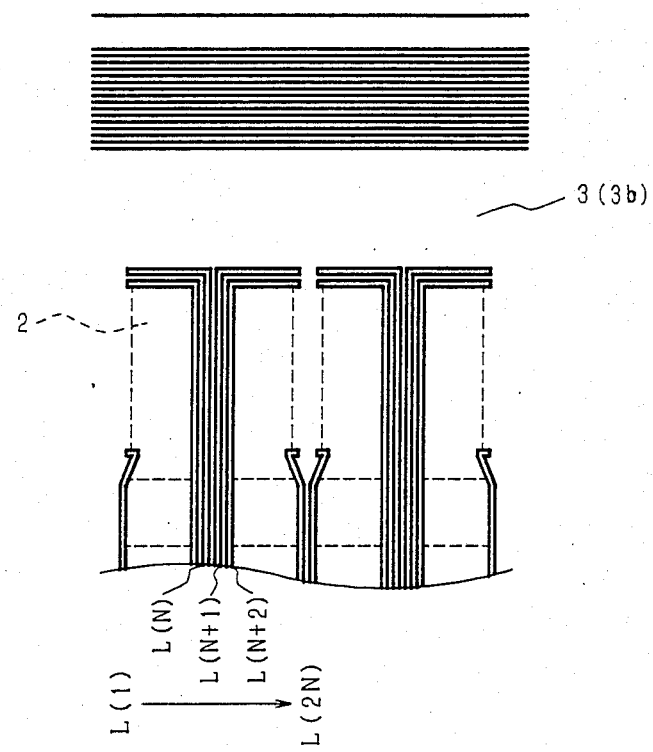
FIG. 8 is a typical view showing a printed pattern on a liquid crystal display panel for executing the driving method of the invention.
Figure 9A:
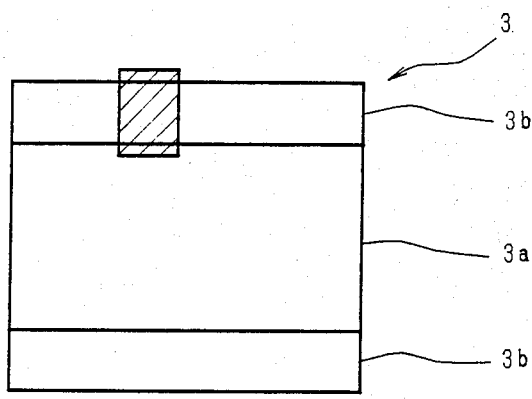
FIG. 9(a) is a plan view of the liquid crystal display panel.
Figure 9B:
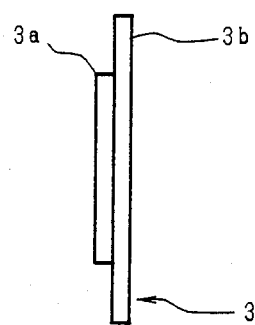
FIG. 9(b) is a side view of the liquid crystal display panel.

Referring to FIGS. 6, 7 and 8, reference numeral 1 designates a film carrier which uses polyimide resin as a base film, 2 designates a driving IC chip being rectangular when viewed in plane, and 3 designates a liquid crystal display panel of simple matrix type. The liquid crystal display panel 3, as shown in FIG. 9(a), (b), has a glass substrate 3a (at front side) and a glass substrate 3b (at back side) which are different from each other in size. The glass substrate 3a of these two is shown in FIG. 6, the other glass substrate 3b being shown in FIG. 8. FIG. 8 is an enlarged view of a part applied with hatching in FIG. 9(a), and shows a printed pattern on the glass substrate 3b of the liquid crystal display panel 3 in state where the film carrier 1 is removed. Electrodes L(1), ... L(2N), at the liquid crystal display panel 3 of simple matrix type are some of electrodes disposed, for example, in a vertical direction thereof, and these electrodes are connected with the output terminals of one driving IC chip 2. The driving IC chip 2 activates the electrodes L(1), ... L(2N). In addition, in the embodiment, in the same way as the conventional example, the number of data, that is, the number of outputs, allotted to one driving IC chip 2 is represented by 2N and driving signals to be supplied to electrodes L(1), L(2) ... L(2N) at the liquid crystal display panel 3 are represented by S(1), S(2) ... S(2N) respectively, the display data corresponding to each driving signal are represented by D(1), D(2) ... D(2N).

Figure 3:
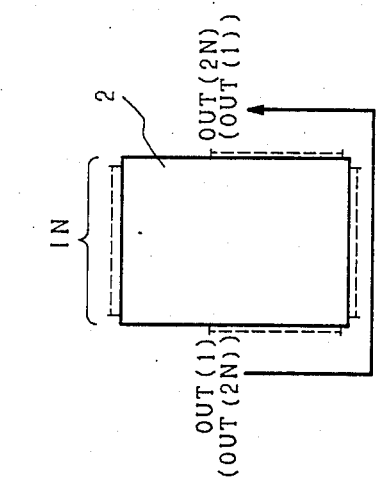
FIG. 3 is a typical view showing arrangement of input terminals and output terminals of the conventional driving IC chip.
Figure 4:
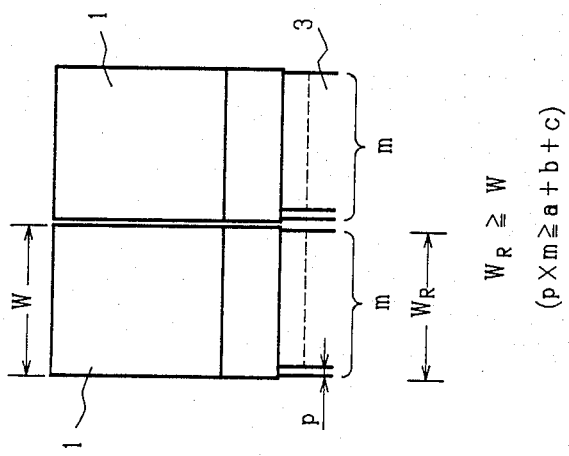

In the same way as the conventional example (refer to FIG. 3), the input signal terminals are arranged on one side of the driving IC chip 2 and the output signal terminals are arranged clockwise (or counterclockwise) in regular order on other three sides. The output terminals of the film carrier 1 are arranged on the sides perpendicular to the side where the input signal terminals of the driving IC chip 2 arranged. The output terminals of the film carrier 1 and the driving IC chip 2 are connected with each other by the printed pattern shown in FIG. 7. In other words, the output signal lines from the two parallel sides of driving IC chip 2 travels horizontally to connect with the output terminals of film carrier 1 and the output signal lines from the remaining side of driving IC chip travel downward and then bend perpendicularly to connect with the output terminals of the film carrier 1.

The printed pattern on the glass substrate 3b of the liquid crystal display panel 3, as shown in FIG. 8, travels from the position of the output terminals of film carrier toward the middle section of film carrier and then perpendicularly bend to travel toward the display unit of liquid crystal display panel 3. A plurality of transverse parallel lines show conductive patternings on the glass substrate 3b to transmit input signals to the driving IC chip 2. The conductive patternings are connected with the input signal lines of the driving IC chip 2.

Such printed pattern connects the output terminal OUT(1) of driving IC chip 2 with an electrode L(N+1) on the liquid crystal display panel 3, that OUT(2) with an electrode L(N+2), ..., that OUT(N) with an electrode L(2N), that OUT(N+1) with an electrode L(1), that OUT(N+2) with an electrode L(2), ..., and that OUT(2N) with an electrode L(N).

Next, explanation will be given on operation of the flat panel display apparatus of the invention.

The display data is supplied to the driving IC chip 2 in the order which is established by dividing the display data allotted to one driving IC into halves and exchanging the former half and the latter half. In other words, the display data is supplied to the driving IC chip 2 in the order of D(N+1), D(N+2) ... D(2N), D(1), D(2) ... D(N).

Accordingly, the driving signal S(N+1) is outputted from the output terminal OUT(1) of driving IC chip 2, that S(N+2) from OUT(2), ..., that S(2N) from OUT(N), that S(1) from OUT(N+1), that S(2) from OUT(N+2), ... and that S(N) from OUT(2N). At this time, since the output terminals at the driving IC chip 2 and electrodes of the liquid crystal display panel 3 are connected with each other through the aforesaid printed pattern, the driving signal S(1) is accurately outputted to the electrode L(1) at the liquid crystal opanel 3, that S(2) to the electrode L(2), ..., and that S(2N) to the electrode L(2N).

Figure 1:
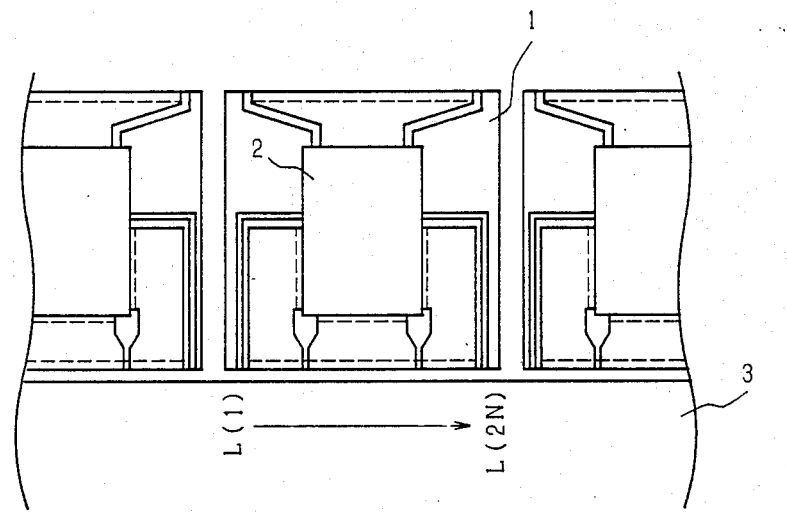
FIG. 1 is a typical view showing the mounting method of the conventional driving IC.
Figure 2:
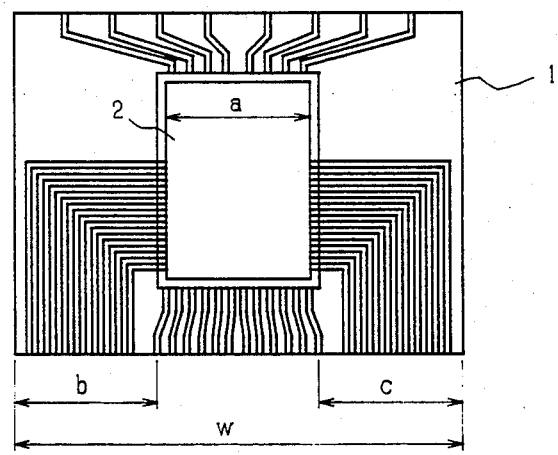
FIG. 2 is an enlarged view of the conventional film carrier.
Figure 5:
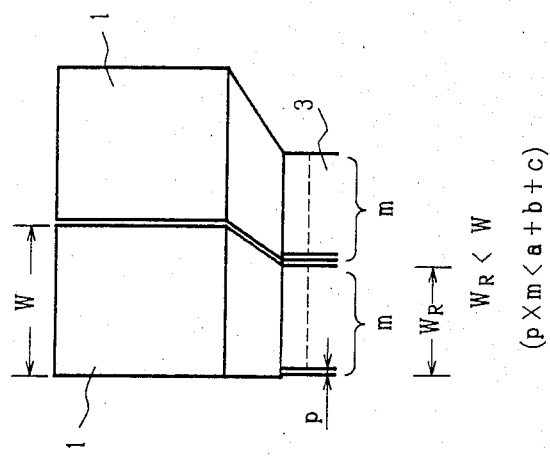
FIGS. 4 and 5 are typical views showing the relation between a width w of an actual film carrier and a width $w_R$ of a film carrier permitted for practical use.

Next, explanation will one given on comparison of width of the film carrier of the invention with that of the conventional film carrier. The width of the conventional example, as shwon in FIG. 2, is limited by a width a of the driving IC chip 2 and printing widths b and c of the printed pattern. On the other hand, the width of film carrier of the invention, as shown in FIG. 7, is limited mainly only by a width a of the driving IC chip 2. In other words, since the printing width of the printing pattern of the invention is negligible, the width of film carrier is reducible more than the film carrier of the conventional example.

Accordingly, in the present invention, even when the pitch p between the picture elements becomes smaller, a geometrical problem is not caused as far as a product p×m of the pitch p between the picture elements multiplied by the number m of data allotted to one driving IC chip 2 is larger than the width a of the driving IC chip 2. As a result, there is no geometrical problem even when the pitch between the picture elements is reduced in order to obtain high resolution.

In addition, the present embodiment uses the liquid crystal display panel as the display panel, but other display panel, such as EL display panel, may of course be usable for the present invention.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A method for producing a spatial correspondence between a plurality of output signals of a plurality of display driving integrated circuits and a plurality of input signals of a flat panel display apparatus for driving said flat panel display apparatus, wherein a plurality of display data are supplied to each of said plurality of display driving integrated circuits so as to output said plurality of output signals, generated from said display data, from said display driving integrated circuits to the electrodes of said display panel to drive said display panel, characterized in that said plurality of display data allotted to each of said display driving integrated circuits are divided into preceding and succeeding halves and the display data are supplied to said display driving integrated circuit with the display data within each of said preceding and succeeding halves being reversed in order 2. A driving method for a flat panel display apparatus according to claim 1, wherein said display panel is a liquid crystal display panel.

3. A driving method for a flat panel display apparatus according to claim 1, wherein said display panel is an electroluminescence display panel.

4. A flat panel display apparatus with driving integrated circuits, each of which has four sides and has input terminals on one side and output terminals on the other three sides, and film carriers, having ar least four sides, on which each of said driving integrated circuits is mounted and on which input signal lines connected to input terminals of each of said driving integrated circuit and output signal lines connected to output terminals of each of said driving integrated circuits and to output terminals of said film carriers are patterned;

characterized in that said output terminals of each of said film carriers are all arranged on sides of said film carrier that are approximately perpendicular to the side of said driving integrated circuits on which said input terminals of each said driving integrated circuits are arranged.

5. A flat panel display apparatus according to claim 4, wherein said output terminals of each of said driving integrated circuits are arranged clockwise in regular order.

6. A flat panel display apparatus according to claim 4, wherein said output terminals of each of said driving integrated circuits are arranged counterclockwise in regular order.

7. A flat panel display apparatus according to claim 4, wherein each of said film carriers uses polyimide resin as a base material.

* * * * *